(12) United States Patent
McManus et al.

(10) Patent No.: US 9,738,804 B2
(45) Date of Patent: Aug. 22, 2017

(54) INK COMPOSITION

(71) Applicant: Hewlett-Packard Development Company, L.P., Houston, TX (US)

(72) Inventors: Richard J. McManus, Corvallis, OR (US); Sundar Vasudevan, Corvallis, OR (US); Vladimir Jakubek, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/308,532

(22) PCT Filed: Jun. 6, 2014

(86) PCT No.: PCT/US2014/041368
§ 371 (c)(1),
(2) Date: Nov. 2, 2016

(87) PCT Pub. No.: WO2015/187181
PCT Pub. Date: Dec. 10, 2015

(65) Prior Publication Data
US 2017/0166765 A1    Jun. 15, 2017

(51) Int. Cl.
*B41J 2/175* (2006.01)
*C09D 11/36* (2014.01)
(Continued)

(52) U.S. Cl.
CPC ........... *C09D 11/36* (2013.01); *B41J 2/17503* (2013.01); *C09D 11/102* (2013.01); *C09D 11/38* (2013.01)

(58) Field of Classification Search
CPC .. B41J 2/17503; C09D 11/033; C09D 11/037; C09D 11/102; C09D 11/30;
(Continued)

(56) References Cited

U.S. PATENT DOCUMENTS 4,129,587 A * 12/1978 Jennings ............... C07C 255/00
558/363
4,405,329 A    9/1983 Abel et al.
(Continued)

FOREIGN PATENT DOCUMENTS

JP    2097576    4/1990
TW    201249937    12/2012
(Continued)

OTHER PUBLICATIONS

International Search Report and Written Opinion for International Application No. PCT/US2014/041368 dated Feb. 16, 2015, 10 pages.

*Primary Examiner* — Anh T. N. Vo
(74) *Attorney, Agent, or Firm* — Dierker & Kavanaugh, P.C.

(57) ABSTRACT

An ink composition includes colorant, hydroxylated and non-hydroxylated co-solvents, and water. A weight percent ratio of hydroxylated to non-hydroxylated co-solvents ranges from 46:54 to about 62:38. The composition also includes an acid and a polyurethane copolymer binder. The acid is selected from the group consisting of oleic acid, linoleic acid, undecanoic acid, dodecanoic acid, tridecanoic acid, and combinations thereof. The binder is formed from the polymerization of a diisocyanate and at least three diols including a first diol containing a hydrophilic stabilizing group, and a second diol having less than 8 atoms in a backbone chain between two hydroxyl groups. A mole percentage of the second diol is at least 30% of a total mole percentage of diol monomers in the binder. An acid number of the binder ranges from 50 to 75. The composition also includes lithium present in an amount ranging from about 50 to about 400 ppm.

15 Claims, 4 Drawing Sheets

(51) Int. Cl.
*C09D 11/38* (2014.01)
*C09D 11/324* (2014.01)
*C09D 11/102* (2014.01)

(58) Field of Classification Search
CPC ..... C09D 11/32; C09D 11/322; C09D 11/324; C09D 11/36; C09D 11/38; G01D 11/00
See application file for complete search history.

(56) References Cited

U.S. PATENT DOCUMENTS

| | | | |
|---|---|---|---|
| 5,160,372 A | 11/1992 | Matrick | |
| 5,258,064 A | 11/1993 | Colt | |
| 5,472,490 A | 12/1995 | Sawamura et al. | |
| 5,492,653 A * | 2/1996 | Hochheimer | C09D 5/24 106/1.14 |
| 5,539,038 A | 7/1996 | Katsen et al. | |
| 5,658,499 A * | 8/1997 | Steinberg | C09D 5/24 106/1.14 |
| 5,734,403 A | 3/1998 | Suga et al. | |
| 5,980,623 A | 11/1999 | Hiraoka et al. | |
| 6,124,376 A | 9/2000 | Nichols et al. | |
| 6,383,275 B1 | 5/2002 | Lin | |
| 7,695,555 B2 | 4/2010 | Kabalnov et al. | |
| 7,705,069 B2 | 4/2010 | Reinhardt et al. | |
| 7,901,499 B2 | 3/2011 | Kitamura et al. | |
| 8,003,714 B2 | 8/2011 | Yamashita | |
| 8,029,612 B2 | 10/2011 | Ishii et al. | |
| 8,636,351 B2 | 1/2014 | Hasegawa et al. | |
| 9,410,010 B2 * | 8/2016 | Roberts | C08G 18/0823 |
| 2003/0060537 A1 | 3/2003 | Palazzo | |
| 2004/0110865 A1 | 6/2004 | McCovick et al. | |
| 2005/0004263 A1 | 1/2005 | Gould et al. | |
| 2007/0040880 A1 | 2/2007 | Jackson et al. | |
| 2007/0076068 A1 | 4/2007 | Guo et al. | |
| 2007/0091156 A1 | 4/2007 | Jackson | |
| 2008/0178766 A1 | 7/2008 | McGorrin | |
| 2009/0031922 A1 | 2/2009 | Rengaswamy et al. | |
| 2010/0075052 A1 | 3/2010 | Irita | |
| 2010/0081740 A1 | 4/2010 | Jackson | |
| 2011/0012954 A1 | 1/2011 | Brown et al. | |
| 2011/0234695 A1 | 9/2011 | Yamazaki et al. | |
| 2011/0236649 A1 | 9/2011 | Nishiki et al. | |
| 2012/0156375 A1 | 6/2012 | Brust et al. | |
| 2012/0162307 A1 | 6/2012 | Yamazaki | |
| 2013/0057625 A1 | 3/2013 | Yamazaki | |
| 2013/0108952 A1 | 5/2013 | Nakano et al. | |
| 2013/0237661 A1 | 9/2013 | Brust et al. | |
| 2013/0253130 A1 | 9/2013 | Berge | |
| 2013/0267656 A1 | 10/2013 | Berge | |
| 2013/0321521 A1 | 12/2013 | Fujie et al. | |
| 2014/0017461 A1 | 1/2014 | Matsuyama | |
| 2014/0071196 A1 | 3/2014 | Hihara et al. | |

FOREIGN PATENT DOCUMENTS

| | | |
|---|---|---|
| WO | WO-96/10603 | 4/1996 |
| WO | WO-2004/080723 | 9/2004 |
| WO | WO-2009034394 | 3/2009 |
| WO | WO-2011/115614 | 9/2011 |
| WO | WO-2013/095497 | 6/2013 |
| WO | WO-2013/192268 | 12/2013 |

* cited by examiner

INK COMPOSITION

BACKGROUND

Inkjet printing or recording systems are commonly used as an effective way to produce images on a print medium, such as paper. Generally, ink droplets are ejected from a nozzle by the inkjet printing system and onto the print medium to produce an image thereon. Examples of inkjet printing systems include thermal inkjet printers and piezoelectric inkjet printers.

BRIEF DESCRIPTION OF THE DRAWINGS

Features and advantages of examples of the present disclosure will become apparent by reference to the following detailed description and drawings, in which like reference numerals correspond to similar, though perhaps not identical, components.

DETAILED DESCRIPTION

Figure 1:
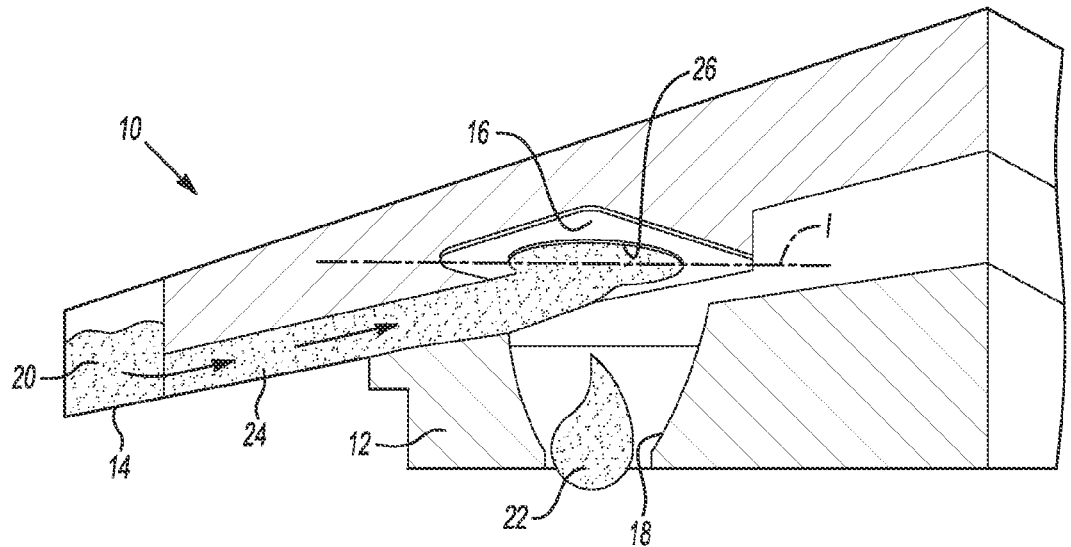
FIG. 1 is an enlarged, cutaway, cross sectional, perspective semi-schematic illustration of an example of a print cartridge including an example of the ink composition disclosed herein.

Examples of the ink composition disclosed herein exhibit desirable print quality, print reliability, and decap performance (thereby maintaining good nozzle health). With many inkjet inks, it is difficult to simultaneously achieve all of these attributes. For example, inks having a relatively high solids content (e.g., pigment and/or polymer/binder loading) for improved image optical density and durability may exhibit poor print reliability. For another example, inks having a lower solids content for improved print reliability and decap performance may result in images with poor optical density and/or durability.

The term "print reliability," as used to herein, generally refers to the ability of a print cartridge or pen to recover and successfully print after being stored capped for some extended period of time. During capped storage, the colorant in the ink may settle out of the dispersed state and plug the nozzle(s) of the print cartridge. Also during capped storage, the polymer/binder, alone or in combination with the colorant, may form a plug locally within the nozzle. If nozzles are completely plugged, the print cartridge may be rendered useless. It has been found that blocked nozzles may be skewed towards one end of the print cartridge (e.g., the lower end if the cartridge is stored on an angle/tilt, e.g., 5°). The skewed failure may be due to settling colorant. Capped storage has also been found to lead to random nozzle failure throughout the print cartridge (i.e., nozzle failure is not concentrated to one particular area of the cartridge). Random nozzle failure may be due to locally formed binder or binder and colorant plugs.

The term "decap performance," as referred to herein, means the ability of the inkjet ink to readily eject from the printhead, upon prolonged exposure to air. The decap time is measured as the amount of time that a printhead may be left uncapped before the printer nozzles no longer fire properly, potentially because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. Another decap metric is the number of spits required to get the pen healthy at a specific time interval. The longest decap time that would give acceptable first drop quality or the fewest number of spits required at any given decap time would be desirable for any given ink.

Generally, as water evaporates from an ink formulation, the percentage of organic components in the ink increases. As the ink becomes more enriched in the organic co-solvents and other nonvolatile components, a colorant (e.g., a dispersed pigment) therein which is strongly hydrophilic is pulled back/retracted into the bulk of the aqueous phase.

Examples of the present disclosure control the degree/rate of pigment retraction in an efficient and cost-effective manner. Pigment retraction is referred to herein as "pigment ink vehicle separation" (PIVS).

As pigmented ink dries in an inkjet printhead, a rapid PIVS may take place (e.g., within about 1-4 seconds), which may result in the nozzles and/or the ink channel being substantially devoid of the colorant. As such, a rapid rate of PIVS is generally undesirable because of the idle (or decap) time being too short. To address PIVS, inkjet printers may force the printhead to spit onto a special absorbing pad/spittoon on a regular basis after a period of idle time (e.g., a predetermined number of spits per nozzle at a given frequency may maintain nozzle health of idle nozzles during printing). The rate of spitting is substantially controlled by the rate of PIVS. Very frequent spits are generally undesirable, because ink is consumed during spitting, and printing is slowed down.

In contrast, a slow rate of PIVS (e.g., from about greater than 4 seconds to about 60 seconds) is generally beneficial for the printhead functioning, for example, when the printhead is stored in an uncapped position, because it prevents the undesirable clogging of the nozzles or retraction of the colorant from the nozzle. Further, in some instances, it may be desirable for a print system to exhibit very slow PIVS (e.g., from greater than a minute to several hours).

Further, examples of the ink composition according to the present disclosure also provide improved decap performance for dye-based inks. In the case of both pigment-based and dye-based previously known inks, as water evaporates, a viscous plug may form at the nozzle in some instances. A subsequent ink drop would have to be fired through this viscous plug, and as such, the first few drops may not be ejected/ejected appropriately out of the orifice. Depending on the ink, successful ejection may occur after a couple of firing events. In contrast, examples of the ink composition of the present disclosure appear to prevent formation of this viscous plug (in pigment-based or dye-based inks), as well as controlling PIVS (in pigment-based inks).

Examples of the ink composition disclosed herein include components that provide excellent print reliability and decap performance. In addition, the ink composition includes a high solids content, and thus forms prints with a desirable optical density and durability. "High solids content," as used herein, refers to the total weight percent of the combination of a colorant and a polyurethane copolymer binder in the ink composition. In an example, the high solids content ranges from about 4.5 wt % to about 9.0 wt % of the total wt % of the ink composition.

In particular, the ink composition disclosed herein includes a combination of a particular polyurethane copolymer binder and a particular co-solvent system. It is believed that the binder and the co-solvent system interact with each other and with the colorant in a manner that enables a relatively high solids loading/content to be included without deleteriously affecting the print reliability. The co-solvent system includes a combination of one solvent that had previously been found to contribute to blocked nozzles skewed towards one end of the print cartridge and another solvent that had previously been found to contribute to random nozzle failure. In the examples disclosed herein, the combination of these two solvents unexpectedly results in an ink composition that does not exhibit either blocked nozzles skewed towards one end of the print cartridge or random nozzle failure.

In addition, the ink composition disclosed herein may be suitable for use with any inkjet printing system (e.g., thermal, piezoelectric). For example, the ink composition may be printed with an inkjet printer having a drop frequency ranging from about 2 kHz to about 36 kHz. As such, the ink composition may be printed with a high speed inkjet printer (an example of which has a drop frequency ranging from about 24 kHz to about 36 kHz).

In the examples disclosed herein, the ink composition includes the colorant, the co-solvent system, an acid, the polyurethane copolymer binder, lithium, and a balance of water. Other additives, such as a biocide or a non-ionic surfactant may also be added to the ink composition.

The colorant may be any of self-dispersed pigments, polymer dispersed pigments, dyes, and combinations thereof.

Carbon blacks may be used as the colorant in examples of the present ink composition. For example, carbon blacks may be used that are of the lamp black, furnace black or gas black type. These carbon blacks may be made water dispersive: through oxidation, either through the carbon black process or through post carbon black manufacturing treatment (e.g., by ozonation); by reaction of the carbon black surface with either small molecule, oligomeric or polymeric materials that are water soluble or dispersive in nature (e.g., p-aminobenzoic acid, acrylic based oligomers or polymers made of monomers such as acrylic or methacrylic acid and esters thereof, and/or polyurethane oligomers or polymers). These carbon blacks may also be made dispersive in water through adsorption of oligomers or polymers of the previously mentioned acrylic, methacrylic, or polyurethane compositions. Carbon blacks can be further made dispersive through encapsulation of the pigment with a latex polymer composed of, e.g., acrylic acid, acrylic esters, methacrylic acid, methacrylic esters, styrene or vinyl acetate. These materials can be made dispersive through the inclusion of various functional groups (such as carboxylates, sulfonates, phosphates or ethylene oxide derivatives) within the polymer.

Some suitable self-dispersed carbon blacks, as well as polymer dispersed pigments are commercially available from E.I. du Pont de Nemours and Co. (Wilmington, Del.), Sensient Technologies Corporation (Milwaukee, Wis.), and Cabot Corporation (Boston, Mass.).

Other pigments with no limitation on color or chemical composition can be used, some examples of which include PY74, PY155, PY128, PY185, PR122, PR254, PR178, PV19, PB15:2, PB15:3, and PB15:4. These colorants can also be made dispersive in water by various means such as small molecule, oligomeric or polymeric attachment, through adsorption of oligomeric or polymeric materials, or through encapsulation (e.g., as described for carbon black).

Any suitable dyes may be used in examples of the present ink composition.

In the examples disclosed herein, the colorant is present in an amount ranging from about 2 wt % to about 6.5 wt % of the total wt % of the ink composition. In another example, the colorant is present in an amount ranging from about 4 wt % to about 4.5 wt % of the total wt % of the ink composition. It is to be understood that the colorant, along with the polyurethane copolymer binder, makes up the high solids content of the ink composition. In an example, the colorant loading and the polyurethane copolymer binder loading are selected so that the total (high) solids content of the ink composition ranges from about 4.5 wt % to about 9.0 wt % of the total weight percent of the ink composition. Any suitable amount of the colorant and/or binder within the given ranges may be selected as long as the total (high) solids content of the ink composition ranges from about 4.5 wt % to about 9.0 wt %. Examples of the polyurethane copolymer binder amount are described below.

The co-solvent system disclosed herein includes a hydroxylated co-solvent and a non-hydroxylated co-solvent. The weight percent ratio of the hydroxylated co-solvent to the non-hydroxylated co-solvent ranges from 46:54 to about 62:38. In an example, the ink composition includes from about 9 wt % to about 14.5 wt % of the hydroxylated co-solvent, and from about 9 wt % to about 10.5 wt % of the non-hydroxylated solvent. The respective weight percent is selected so that the weight percent ratio of hydroxylated to non-hydroxylated co-solvents is in accordance with the range provided herein. In some examples, the hydroxylated solvent is present in an amount that is greater than the non-hydroxylated solvent. Furthermore, it is to be understood that no other solvents are included in the ink composition.

Examples of the hydroxylated co-solvent include 2-methyl-1,3-propanediol, 2-hydroxyethyl-2-pyrrolidinone, 2-ethyl-2-hydroxymethyl-1,3-propanediol (EHPD) (also known as trimethylolpropane), di-(2-hydroxyethyl)-5, 5-dimethylhydantoin (commercially available as DANTOCOL® DHE from Lonza, Inc., Allendale, N.J.), glycerol, diethylene glycol, triethylene glycol, tripropylene glycol, tetraethylene glycol, dipropyleneglycol, 3-methyl-1,3-butanediol, 3-methyl-1,5-pentanediol, 1-(2-hydroxyethyl)-2-imidazolidinone, 1,6-hexanediol, 1,5-pentanediol, and combinations thereof.

Examples of the non-hydroxylated co-solvent include 2-pyrrolidinone, sulfolane, diethyleneglycol dimethyl ether, and combinations thereof.

One specific example of the co-solvent system includes 2-methyl-1,3-propanediol as the hydroxylated co-solvent and 2-pyrrolidinone as the non-hydroxylated co-solvent. In this example, the weight percent ratio of 2-methyl-1,3-propanediol:2-pyrrolidinone is about 50:50. Another specific example of the co-solvent system includes 2-hydroxyethyl-2-pyrrolidinone as the hydroxylated co-solvent, and a combination of 2-pyrollidinone and sulfolane as the non-hydroxylated co-solvent. In this example, the weight percent ratio of 2-hydroxyethyl-2-pyrrolidinone:the combination of 2-pyrollidinone and sulfolane is about 56:44.

As mentioned above, examples of the ink composition also include lithium, and an acid (e.g., a fatty acid surfactant) chosen from oleic acid (i.e., cis-octadec-9-enoic acid, having one cis double bond), linoleic acid (two cis double bonds), undecanoic acid, dodecanoic acid, tridecanoic acid, and combinations thereof.

The fatty acid surfactant has a carboxylate head and a long alkyl tail. It appears that the carboxylate group aids in contributing to good decap. In addition, the alkyl tail has one or two cis double bonds. It has been discovered that the corresponding fully saturated fatty acids with 14 carbons or more, or those with trans double bonds generally do not provide the same benefit for enhancing decap performance. As such, examples of the ink composition of the present disclosure exclude acids chosen from stearic acid (a fully saturated fatty acid with 18 carbons), elaidic acid (the trans isomer of oleic acid), linolenic acid (three cis double bonds), linear (as opposed to branched) saturated fatty acids having a carbon chain of fewer than 11 carbons, and linear saturated fatty acids having a carbon chain of more than 13 carbons, and combinations thereof.

In an example, the chosen acid is dodecanoic acid (also known as lauric acid).

The acid is present in an amount ranging from about 0.03 wt % to about 1.0 wt % of the total wt % of the ink composition.

It is to be understood that the lithium may be present in the composition as an ion in solution, or as a lithium salt of the acid. As an example, the lithium may be added to the ink composition in the form of a number of its salts, for example, lithium chloride, lithium bromide, lithium iodide, lithium hydroxide, lithium acetate, lithium benzoate, lithium nitrate, or combinations thereof. However, lithium carbonate is generally not desirable; as it appears to degrade decap performance in some instances.

Further, other alkali metals, e.g., sodium and/or potassium, may be present in examples of the ink composition. However, it is to be understood that the lithium aids in forming an anti-evaporative layer; whereas other alkali metals that may be present do not function to aid in formation of the anti-evaporative layer, nor do they hinder formation of the anti-evaporative layer.

The binder used in the ink composition disclosed herein is a polyurethane copolymer binder formed from the polymerization of a diisocyanate and at least three diols. In an example, the at least three diols include a first diol containing a hydrophilic stabilizing group, and one or more of a second diol having less than 8 atoms in a backbone chain between two hydroxyl groups (which leads to the formation of a short hard segment (shown in formula (IV) below)). In another example, the at least three diols include the first diol, the second diol, and a third diol having a formula OH—R—OH, wherein R is selected from the group consisting of a polyether, a polyester, a polycarbonate, a polycarbonate-co-polyester, and an acrylic. In yet another example, the at least three diols include the first diol, the second diol, and a third diol having a formula OH—$R^4$—OH, where "$R^4$" is defined in formula IV below. As examples, $R^4$ may be a $C_1$-$C_7$ alkyl, or a $C_6$-$C_{40}$ aryl, or a $C_9$-$C_{40}$ aryl substituted by $C_1$-$C_{10}$ alkyl. Examples of each of the diols are provided below.

In the examples disclosed herein, the polyurethane copolymer binder is formed from the reaction of isocyanate and diols, and thus includes hard and soft segments. The hard segment is the segment in between and including two adjacent carbamate groups. The soft segment is formed from high molecular weight diols or polyols. A soft segment is mobile and may be present in a coiled formation. The urethane groups on one polymer chain form hydrogen bonds with the same or similar groups on neighboring polymer chains, resulting in a polyurethane network. In many instances, a soft continuous phase surrounds a hard semi-crystalline region in a polyurethane network.

In the polyurethane, the hard segment is covalently coupled to a soft segment. Adjusting the hard and soft segments can provide the polyurethane copolymer with a desired level of elasticity and toughness. In many polyurethanes, ionizable groups are incorporated into the hard segment to render the polyurethane water dispersible. However, ionizable groups can interfere with the inter-molecular hydrogen bonding, and thus in the examples disclosed herein, ionizable groups are not included in at least the short hard segments (e.g., see formula (IV) below) of the resulting polyurethane copolymer. This strengthens the polyurethane copolymer. Separation of ionizable groups from the short hard segment can also lead to better control of the acid content while reducing the time for semi-crystalline region formation, which in turn reduces the dry-time.

In the examples disclosed herein, the ratio of the isocyanate to diol is greater than 1:1. In an example, the ratio of isocyanate to diol ranges from about 1.05:1 to about 1.5:1.

In an example, the polyurethane copolymer binder has the following structure:

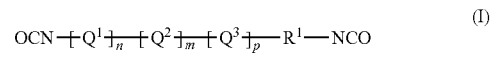

(I)

wherein each of $Q^1$, $Q^2$, and $Q^3$ is independently selected from

(II)

(III)

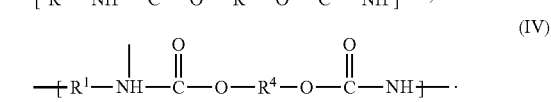

(IV)

as long as $Q^1$, $Q^2$, and $Q^3$ contain at least one of (II), at least one of (III), and at least one of (IV). In (II), (III), and/or (IV), the following are applicable:

each $R^1$ is $C_1$-$C_{20}$ alkyl, $C_3$-$C_{20}$ substituted alkyl, $C_3$-$C_{10}$ cycloalkyl, $C_3$-$C_{20}$ substituted cycloalkyl, or $C_6$-$C_{40}$ aryl or $C_9$-$C_{40}$ substituted aryl from a diisocyanate;

each $R^2$ is independently $C_3$-$C_{20}$ substituted alkyl, $C_3$-$C_{20}$ substituted cycloalkyl, or $C_9$-$C_{40}$ substituted aryl;

each $R^3$ is independently $C_9$-$C_{20}$ alkyl, $C_9$-$C_{20}$ alkyl substituted by $C_1$-$C_{10}$ alkyl or $C_6$-$C_{15}$ aryl, $C_9$-$C_{40}$ aryl or $C_9$-$C_{40}$ aryl substituted by $C_1$-$C_{10}$ alkyl or $C_6$-$C_{20}$ aryl, or —($R^{11}$—O—$R^{10}$—O—$R^{11}$)—; or HO—$R^3$—OH is a diol incorporating polyether, polyester, polycarbonate, polycarbonate-co-polyester, or acrylic;

each $R^4$ is independently $C_1$-$C_7$ alkyl, $C_3$-$C_{20}$ alkyl substituted by $C_1$-$C_{10}$ alkyl or $C_6$-$C_{15}$ aryl, $C_6$-$C_{40}$ aryl or $C_9$-$C_{40}$ aryl substituted by $C_1$-$C_{10}$ alkyl or $C_6$-$C_{20}$ aryl, provided that the backbone atoms on $R^4$ forming a chain linking the two oxygen atoms in (IV) are less than 8;

n, m and p are integers from 1 to 200;

the capping agent is one or more members selected from the group consisting of $R^5CHR^6OH$, $R^5CHR^6SH$, $R^6R^7NH$, H—$(OR^8)_q$—OH, and epoxide $CH_2OCR^6R^7$;

each $R^5$ is H, $C_1$-$C_{20}$ alkyl, $C_3$-$C_{20}$ alkyl substituted by $C_1$-$C_{10}$ alkyl or $C_6$-$C_{15}$ aryl, $C_6$-$C_{40}$ aryl or $C_9$-$C_{40}$ aryl substituted by $C_1$-$C_{10}$ alkyl or $C_6$-$C_{20}$ aryl;

each $R^6$ is H, $C_1$-$C_{20}$ alkyl, $C_6$-$C_{40}$ aryl or —$R^9OR^8$;

each $R^7$ is H, —$R^9OR^8$, $C_1$-$C_{20}$ alkyl, $C_3$-$C_{20}$ alkyl substituted by $C_1$-$C_{10}$ alkyl or $C_6$-$C_{15}$ aryl, $C_6$-$C_{40}$ aryl or $C_9$-$C_{40}$ aryl substituted by $C_1$-$C_{10}$ alkyl or $C_6$-$C_{20}$ aryl, provided that when $R^6$ is H, $R^7$ is not H;

$R^6$ and $R^7$ can be taken together with the nitrogen atom to form a cyclic amine or substituted cyclic amine with an O or S atom replacing a C atom on said cyclic amine;

each $R^8$ is $C_1$-$C_{20}$ alkyl or $C_6$-$C_{20}$ aryl;

each $R^9$ is $C_1$-$C_{20}$ alkyl, $C_3$-$C_{20}$ alkyl substituted by $C_1$-$C_{10}$ alkyl or $C_6$-$C_{15}$ aryl;

each $R^{10}$ is independently $C_4$-$C_{20}$ alkyl, $C_4$-$C_{20}$ alkyl substituted by $C_1$-$C_{10}$ alkyl or $C_6$-$C_{15}$ aryl, $C_9$-$C_{40}$ aryl or $C_9$-$C_{40}$ aryl substituted by $C_1$-$C_{10}$ alkyl or $C_6$-$C_{20}$ aryl;

each $R^{11}$ is independently $C_1$-$C_{20}$ alkyl, $C_4$-$C_{20}$ alkyl substituted by $C_1$-$C_{10}$ alkyl or $C_6$-$C_{15}$ aryl; and q is an integer from 1 to 20.

In the examples disclosed herein, the isocyanate is a diisocyanate. Suitable diisocyanates may be selected from the group consisting of 1,6-hexamethylene diisocyanate (HDI), isophorone diisocyanate (IPDI), trimethylhexamethylene diisocyanate (TMDI), 2,4-toluene diisocyanate (2,4-TDI), 2,6-toluene diisocyanate (2,6-TDI), 4,4'-diphenylmethane diisocyanate (MDI), 4,4-dicyclohexylmethane diisocyanate ($H_{12}$MDI), 3,3'-dimethyl-4,4'-biphenyl diisocyanate (TODI), dodecane diisocyanate ($C_{12}$DI), 1,5-naphthalene diisocyanate (NDI), m-tetramethylene xylylene diisocyanate (TMXDI), 1,4-benzene diisocyanate, trans-cyclohexane-1,4-diisocyanate, and 4,6-xylyene diisocyanate.

Some examples of the first diol, which includes a hydrophilic stabilizing group and ultimately forms part of the monomer with Formula (II), include dimethylol acetic acid, 2,2'-dimethylol butanoic acid, 2,2'-dimethylol propionic acid (DMPA), and 2,2'-dimethylol butyric acid.

Some examples of the second diol, which has less than 8 atoms in the backbone chain between two hydroxyl group and ultimately forms part of the monomer with Formula (IV), include 1,2-propanediol, 1,3-propanediol, ethylene glycol, 1,4-butanediol, 1,5-pentanediol, 1,6-hexanediol, 1,2-hexanediol, neopentyl glycol, 2-methyl-1,3-propanediol, 3-methyl-1,5-pentane diol, and combinations thereof.

When included, examples of the third diol have a hydrophobic segment and ultimately form part of the monomer with Formula (III). Some examples of this third diol have the formula OH—R—OH, wherein R is selected from the group consisting of a polyether, a polyester, a polycarbonate, a polycarbonate-co-polyester, and an acrylic. Other examples of the third diol have the formula OH—$R^4$—OH. $R^4$ may be any of the examples previously given, such as a $C_1$-$C_7$ alkyl, or a $C_6$-$C_{40}$ aryl, or a $C_9$-$C_{40}$ aryl substituted by $C_1$-$C_{10}$ alkyl.

Any suitable method that reacts the isocyanate with the at least three diols may be used to form the polyurethane copolymer. The previously mentioned capping agent may be added when it is desirable to terminate the polymerization. The amount of the capping agent employed should be approximately equivalent to the unreacted isocyanate groups in the prepolymer. The ratio of active hydrogens from amine groups in the chain terminator to isocyanate groups in the prepolymer are in the range from about 1.0:1 to about 1.2:1, or from about 1.0:1.1 to about 1.1:1, or from about 1.0:1.05 to about 1.1:1, on an equivalent basis.

In the final polyurethane copolymer binder, the mole percentage of the second diol is at least 30% of a total mole percentage of diol monomers in the polyurethane copolymer binder. The acid number of the polyurethane copolymer binder ranges from 50 to 75, and the number average ($M_n$) molecular weight of the polyurethane copolymer binder ranges from about 3,500 to about 10,000. In another example, the $M_n$ of the polyurethane copolymer binder ranges from about 5,000 to about 8,500.

The amount of the polyurethane copolymer binder that is included in the ink composition may range from about 1 wt % to about 3 wt % of the total wt % of the ink composition. In another example, the amount of the polyurethane copolymer binder ranges from about 1.7 wt % to about 2.0 wt %. As mentioned above, the colorant loading and the polyurethane copolymer binder loading are selected so that the total (high) solids content of the ink composition ranges from about 4.5 wt % to about 9.0 wt % of the total weight percent of the ink composition. Any suitable amount of the colorant and/or binder within the given ranges may be selected as long as the total (high) solids content of the ink composition ranges from about 4.5 wt % to about 9.0 wt %.

Examples of the ink composition of the present disclosure may further include an additive chosen from non-ionic surfactants, biocides, and combinations thereof.

When a non-ionic surfactant is utilized, a suitable amount of the non-ionic surfactant may range from about 0.05 wt % to about 2 wt %. Some specific examples of the non-ionic surfactant that may be used in the ink composition disclosed herein include acetylene diols, bis-tartrate esters, 1,2-hexanediol, mono alcohols, N-alkylpyrrolidinones, and combinations thereof. One example of the acetylene diol is SURFYNOL® 104, available from Air Products and Chemicals, Inc., Allentown, Pa. Examples of suitable bis-tartrate esters include diisoamyl tartrate, dibutyl tartrate, dibenzyl tartrate, and diisopropyl tartrate. Some examples of suitable mono alcohols include lauryl alcohol (i.e., 1-dodecanol), oleyl alcohol (i.e., octadec-9-en-1-ol), stearyl alcohol (i.e., 1-octadecanol), and combinations thereof. Examples of the N-alkylpyrrolidinone are N-octylpyrrolidinone and N-dodecylpyrrolidinone. Some commercially available N-alkylpyrrolidinones include SURFADONE® LP-100 (octylpyrrolidinone) and SURFADONE® LP-300 (dodecylpyrrolidinone), both of which are available from Ashland Inc. In one example, the non-ionic surfactant is selected so that it does not include any ethyleneoxy groups.

When a biocide is utilized, a suitable amount of the biocide may range from about 0.05 wt % to about 0.5 wt %. It is to be understood that the upper limit for the biocide(s) may depend upon the type of biocide and its toxicological effect and/or regulatory requirements. Suitable biocides include, for example, PROXEL™ GXL, KORDEK™ MLX (The Dow Chemical Co.), BIOBAN™ CS-1246 (The Dow Chemical Co.) and/or ACTICIDE® B20 and/or M20 (Thor GmbH).

In any of the examples disclosed herein, a balance (up to 100 wt %) of the composition is water.

The pH of examples of the ink composition generally ranges from about 7 to about 11. It may be desirable that the ink composition have a basic pH, ranging anywhere from greater than 7 to 12. When the initial pH of the resulting ink composition is acidic, neutral, or near-neutral basic (e.g., having a pH ranging from 7.1 to 8), it may be desirable to adjust the pH of the resulting ink composition to a basic or more basic pH. Any suitable base may be added to adjust the pH, as long as the added base does not interfere with the other desirable properties of the ink composition. Some examples of suitable bases include NaOH or KOH. The amount of base added will depend, at least in part, on the initial pH of the ink composition and the desired final pH of the ink composition. In an example, the pH is adjusted from about 9 to about 10, and a suitable amount of base is added until this pH is obtained.

It has been found that lithium salt(s) of the fatty acid(s) in the examples of the ink composition of the present disclosure form an anti-evaporative layer during uncapped non-use at an interface between the air and the ink composition in an orifice of a nozzle, thereby reducing evaporation of the water from the ink composition. In examples of the present ink composition, the anti-evaporative layer is observed (with an optical microscope) forming by about 2 seconds of uncapped non-use. However, it is believed that formation of the layer begins sooner than 2 seconds of uncapped non-use.

Referring now to FIG. 1, a print cartridge is generally depicted at 10. The print cartridge 10 includes a housing 12 (which may include one or more layers of different materials) that is operatively connected to a reservoir 14 that contains an example of the ink composition 20 disclosed herein. A fluid path/ink channel 24 connects the reservoir 14 to a fluid ejector 16. In a thermal inkjet print cartridge, the fluid ejector 16 is a heating element that creates heat to vaporize the ink composition 20, which creates a bubble that expands to push the ink composition 20 (in the form of drops 22) out of an orifice 26 of a nozzle 18 that is aligned with the fluid ejector 16. While a single fluid ejector 16 and nozzle 18 is shown, it is to be understood that a single print cartridge 10 may include multiple (e.g., 400 or some other desirable number) fluid ejectors 16 and nozzles 18. While not shown, it is to be understood that the print cartridge 10 includes an integrated circuit that routes signals (e.g., from a processor that is capable of running suitable computer readable instructions) to the desirable fluid ejector(s) 16 and nozzle(s) 18 for firing ink drops 22 therefrom to produce images on a desirable medium.

The print cartridge 10 is representative of a single nozzle, and it is to be understood that a single print cartridge includes many nozzles. When included in a high speed inkjet printing system including a page wide array, it is to be understood that several print cartridges 10 (i.e., dies), each of which includes at least 1,000 nozzles, are arranged together. While not shown, it is to be understood that the high speed inkjet printing system may also include an automated service station. This service station may be programmed to ensure that the print cartridge 10 is automatically capped, decapped, and cleaned with minimal system downtime. This also contributes to enhanced print quality.

As mentioned above, lithium salts of the fatty acid(s) in the examples of the ink composition 20 form an anti-evaporative layer during uncapped non-use at an interface I between air and the ink composition 20 in the orifice 26 of the nozzle 18, thereby reducing evaporation of the water from the ink composition 20.

Figure 2:
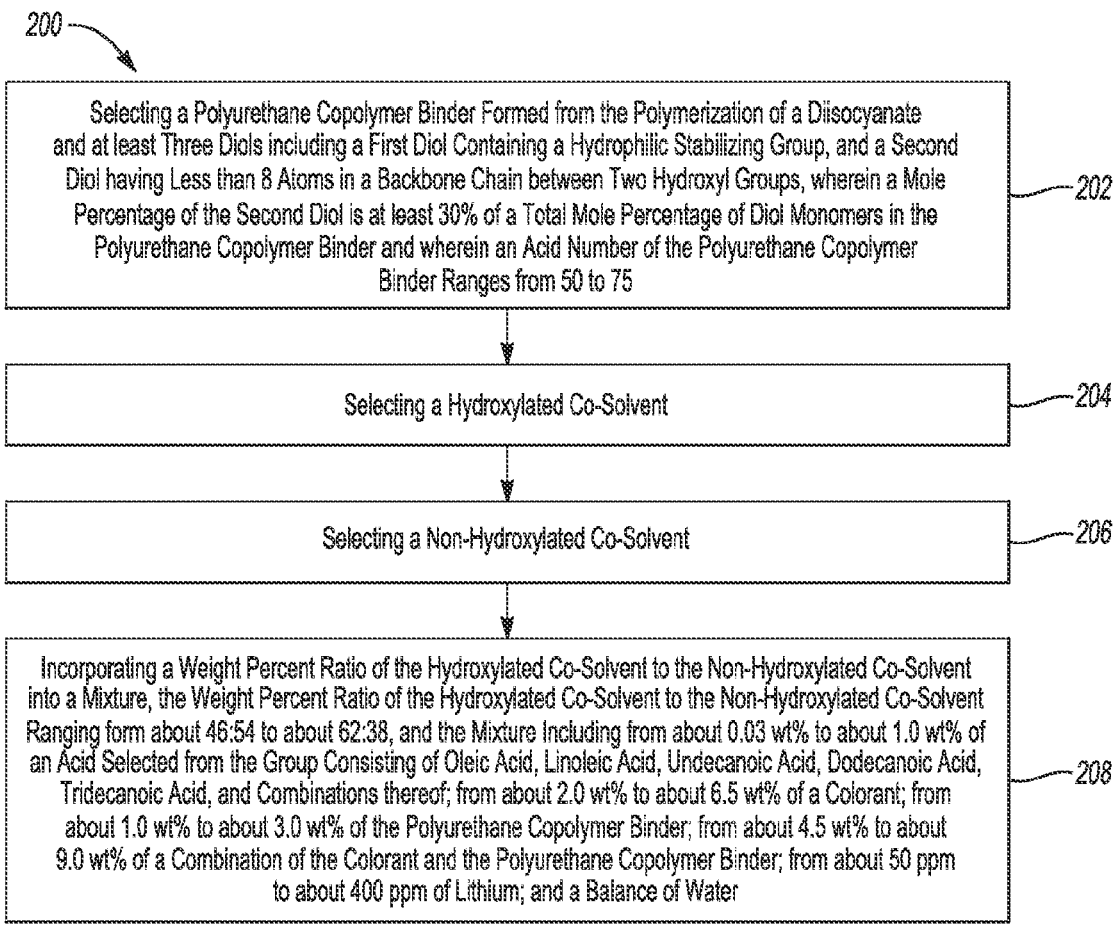
FIG. 2 is a flow diagram illustrating an example of a method according to an example of the present disclosure.

Referring now to FIG. 2, an example of a method for improving capped recovery performance of the ink composition 20 according to the present disclosure is generally depicted at 200. The method 200 includes selecting a polyurethane copolymer binder formed from the polymerization of a diisocyanate and at least three diols including a first diol containing a hydrophilic stabilizing group, and a second diol having less than 8 atoms in a backbone chain between two hydroxyl groups, wherein a mole percentage of the second diol is at least 30% of a total mole percentage of diol monomers in the polyurethane copolymer binder, and wherein an acid number of the polyurethane copolymer binder ranges from 50 to 75, as shown at reference numeral 202. The method 200 also includes selecting a hydroxylated co-solvent (reference numeral 204) and selecting a non-hydroxylated co-solvent (reference numeral 206).

As shown at reference numeral 208, the method 200 also includes incorporating a weight percent ratio of the hydroxylated co-solvent to the non-hydroxylated co-solvent (ranging from about 46:54 to about 62:38) into a mixture, including from about 0.03 wt % to about 1.0 wt % of an acid selected from the group consisting of oleic acid, linoleic acid, undecanoic acid, dodecanoic acid, tridecanoic acid, and combinations thereof; from about 2.0 wt % to about 6.5 wt % of a colorant; from about 1.0 wt % to about 3.0 wt % of the polyurethane copolymer binder; from about 4.5 wt % to about 9.0 wt % of a combination of the colorant and the polyurethane copolymer binder; from about 50 ppm to about 400 ppm of lithium; and a balance of water.

Examples of the ink composition of the present disclosure have a relatively high solids content, and thus form high quality and durable prints. The colorant, binder, and co-solvent system enable the high solids content without deleteriously affecting the print reliability of the ink composition.

To further illustrate the present disclosure, examples are given herein. It is to be understood that these examples are provided for illustrative purposes and are not to be construed as limiting the scope of the present disclosure.

EXAMPLE

Four example inks (Inks C, F, G, and H) including a polyurethane copolymer binder and the co-solvent system disclosed herein were prepared. Five comparative inks (Inks A, B, D, E, and I) including a polyurethane copolymer binder but not including the co-solvent system disclosed herein were also prepared. The polyurethane copolymer binder in comparative inks A, B, and I and in ink C was formed from the reaction of isophorone diisocyanate (IPDI) with 1,3-propanediol, hydroquinone bis(2-hydroxyethyl) ether (HQEE), and dimethylol propionic acid (DMPA). The polyurethane copolymer binder in comparative inks D and E and inks F—H was formed from the reaction of isophorone diisocyanate (IPDI) with 1,3-propanediol, 1,2-propanediol, and dimethylol propionic acid (DMPA).

The formulations of the inks and comparative inks are shown in Table 1. The amounts are given in weight percents. The balance of each of the inks and comparative inks was water.

TABLE 1

| Component | Comp. Ink A | Comp. Ink B | Ink C | Comp. Ink D | Comp. Ink E | Ink F | Ink G | Ink H | Comp. Ink I |
|---|---|---|---|---|---|---|---|---|---|
| Carbon black dispersion | 4.5 | 4.5 | 4.5 | 4.4 | 4.4 | 4.4 | 4.4 | 4.4 | 4.5 |
| 2-pyrrolidinone** | 18 | 0 | 9 | 0 | 0 | 0 | 3.5 | 8.8 | 13 |
| 2-methyl-1,3-propanediol* | 0 | 18 | 9 | 0 | 0 | 0 | 0 | 0 | 0 |

TABLE 1-continued

| Component | Comp. Ink A | Comp. Ink B | Ink C | Comp. Ink D | Comp. Ink E | Ink F | Ink G | Ink H | Comp. Ink I |
|---|---|---|---|---|---|---|---|---|---|
| Lauric acid | 0.18 | 0.18 | 0.18 | 0.24 | 0.24 | 0.24 | 0.24 | 0.24 | 0.18 |
| HE2P* | 0 | 0 | 0 | 14.7 | 16.7 | 13.2 | 13.2 | 13.2 | 0 |
| Sulfolane** | 0 | 0 | 0 | 8.7 | 8.7 | 10.5 | 7 | 1.7 | 1.7 |
| SURFYNOL 104 ® | 0 | 0 | 0 | 0.05 | 0.05 | 0.05 | 0.05 | 0.05 | 0.05 |
| SURFADONE LP-100 ® | 0 | 0 | 0 | 0.05 | 0.05 | 0.05 | 0.05 | 0.05 | 0 |
| Oleic acid** | 0 | 0 | 0 | 0.02 | 0.02 | 0.02 | 0.02 | 0.02 | 0 |
| Polyurethane copolymer binder | 2 | 2 | 2 | 1.7 | 1.7 | 1.7 | 1.7 | 1.7 | 2 |
| 3-methyl-1,3-butanediol* | 0 | 0 | 0 | 0 | 0 | 0 | 0 | 0 | 5 |
| Silicone based surfactant (BYK 348)*** | 0 | 0 | 0 | 0 | 0 | 0 | 0 | 0 | 0.01 |
| Hydroxylated/non-hydoxylated co-solvent weight percent ratio | 0/100 | 100/0 | 50/50 | 63/37 | 66/34 | 56/44 | 56/44 | 56/44 | 25/75 |

*indicates that the solvent is hydroxylated
**indicates the solvent is non-hydroxylated
***from BYK Chemie Ink cartridges filled with comparative inks A and B and Ink C were stored capped for 8 weeks. After the 8 week period, the inks were printed to test for capped recovery. Nozzle pattern prints were produced by jetting the above described ink compositions, on a "HP Recycled paper" with COLORLOK® Technology for office applications, using an HP Cartridge 940 in an HP Office Jet Pro 8000 printer. It is to be understood that the various nozzle patterns were printed on the first page of printing after storage.

Figure 3A:
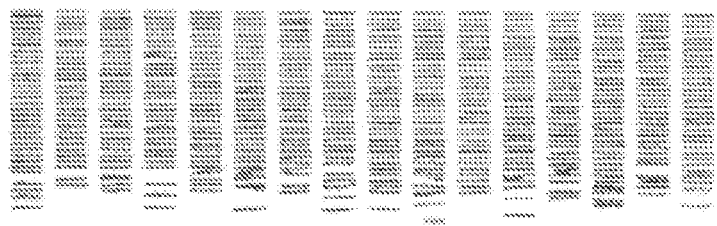
FIGS. 3A through 3I illustrate capped recovery performance of example inks of the present disclosure and comparative example inks.
Figure 3B:
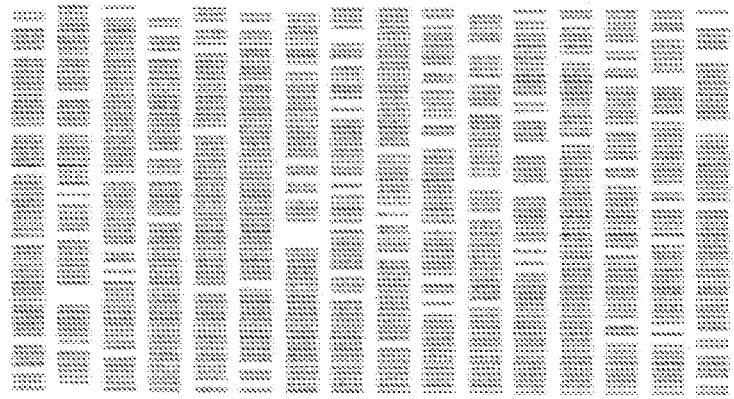
Figure 3C:
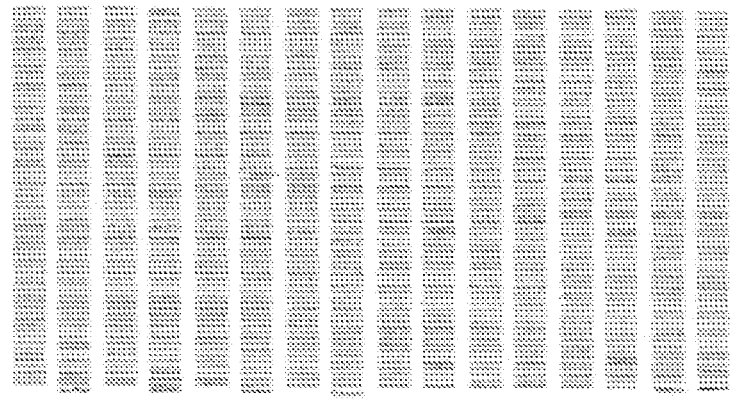

The results for these comparative inks A and B and ink C are shown in FIGS. 3A through 3C, respectively. As shown in FIG. 3A, comparative ink A (with no hydroxylated co-solvent) exhibited blocked nozzles that were skewed towards one end of the print cartridge. As shown in FIG. 3B, comparative ink B (with no non-hydroxylated co-solvent) exhibited random nozzle failure. As shown in FIG. 3C, ink C (50:50 weight percent ratio of hydroxylated to non-hydroxylated co-solvents) exhibits excellent capped recovery.

Figure 3D:
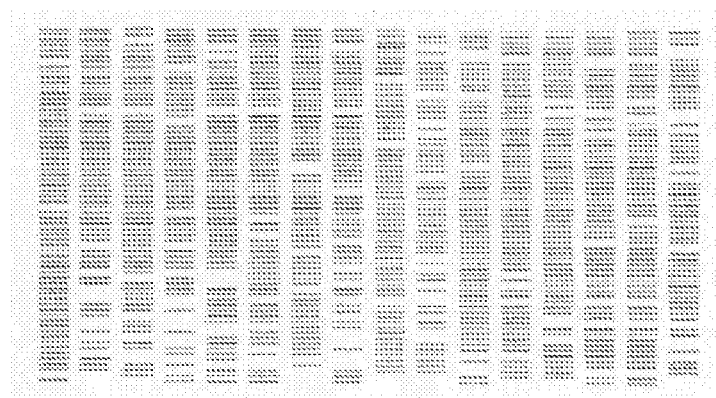
Figure 3E:
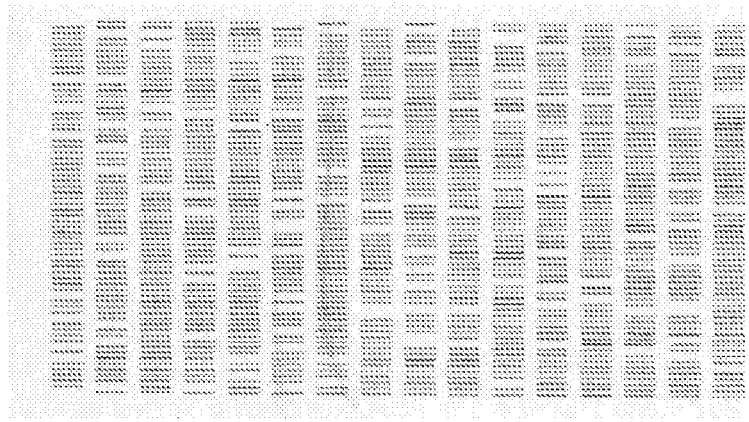
Figure 3F:
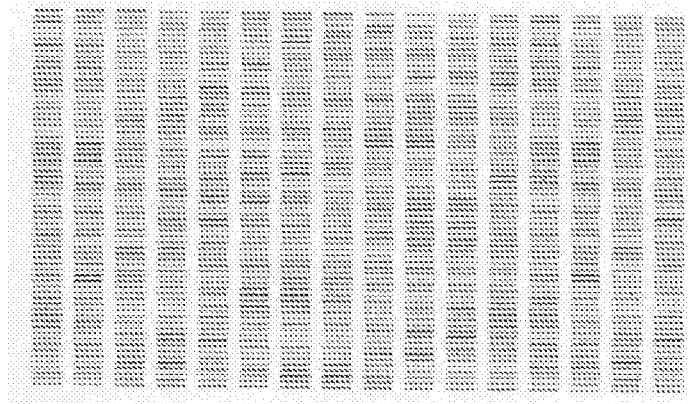
Figure 3G:
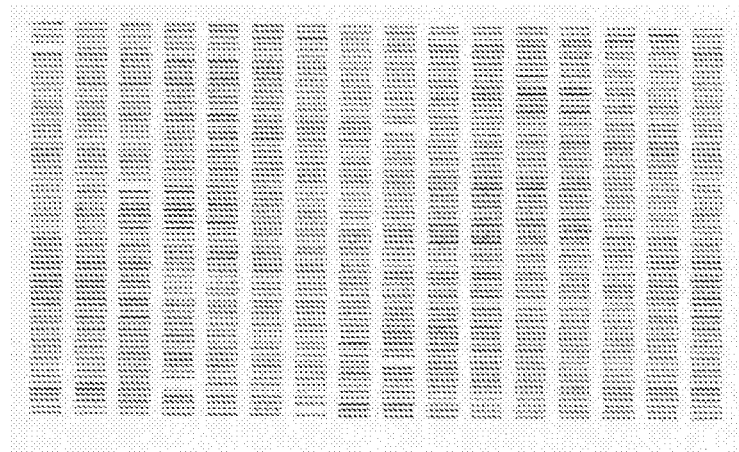
Figure 3H:
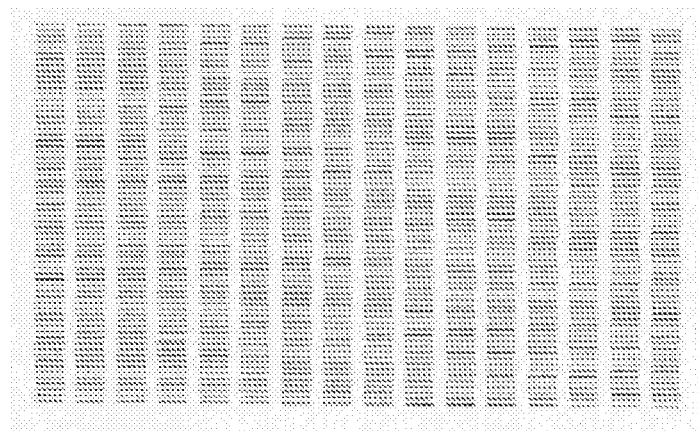
Figure 3I:
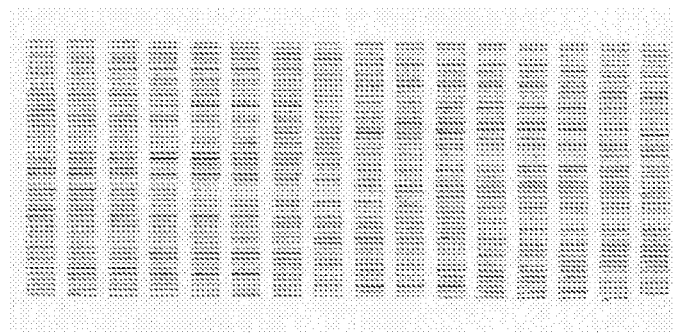

Ink cartridges filled with comparative inks D, E, and I and inks F, G, and H were stored capped for 4 weeks. After the 4 week period, the inks were printed in the same manner described above to test for capped recovery. The results for these comparative inks D, E, and I are shown in FIGS. 3D, 3E, and 3I, respectively. The results for these inks F, G, and H are shown in FIGS. 3F, 3G, and 3H, respectively. As shown in FIG. 3D, comparative ink D (63:37 weight percent ratio of hydroxylated to non-hydroxylated co-solvents) exhibited random nozzle failure. As shown in FIG. 3E, comparative ink E (66:34 weight percent ratio of hydroxylated to non-hydroxylated co-solvents) exhibited random nozzle failure. As shown in FIGS. 3F, 3G, and 3H, inks F, G, and H (56:44 weight percent ratio of hydroxylated to non-hydroxylated co-solvent) exhibited 6 or less random nozzle failures. As shown in FIG. 3I, comparative ink I (25:75 weight percent ratio of hydroxylated to non-hydroxylated co-solvents) exhibited blocked nozzles that were skewed towards one end of the print cartridge (i.e., the bottom of each column did not print).

Each of the comparative inks and inks included a high solids content (greater than 6 wt % carbon black dispersant and polyurethane copolymer binder). Those including the co-solvent system disclosed herein exhibited excellent capped recovery.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range of 50 ppm to about 400 ppm should be interpreted to include not only the explicitly recited limits of 50 ppm to about 400 ppm, but also to include individual values, such as 53 ppm, 104.25 ppm, 350 ppm, etc., and sub-ranges, such as from about 150 ppm to about 375 ppm, from 125 ppm to about 300 ppm, etc. Furthermore, when "about" or "substantially" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An ink composition, comprising:
   a colorant;
   a hydroxylated co-solvent;
   a non-hydroxylated co-solvent, wherein a weight percent ratio of the hydroxylated co-solvent to the non-hydroxylated co-solvent in the ink composition ranges from 46:54 to about 62:38;

an acid selected from the group consisting of oleic acid, linoleic acid, undecanoic acid, dodecanoic acid, tridecanoic acid, and combinations thereof;

a polyurethane copolymer binder formed from the polymerization of a diisocyanate and at least three diols including a first diol containing a hydrophilic stabilizing group, and a second diol having less than 8 atoms in a backbone chain between two hydroxyl groups, wherein a mole percentage of the second diol is at least 30% of a total mole percentage of diol monomers in the polyurethane copolymer binder, and wherein an acid number of the polyurethane copolymer binder ranges from 50 to 75;

lithium present in an amount ranging from about 50 ppm to about 400 ppm; and water.

2. The ink composition as defined in claim 1 wherein:

the hydroxylated co-solvent is selected from the group consisting of 2-methyl-1,3-propanediol, 2-hydroxyethyl-2-pyrrolidinone, 2-ethyl-2-hydroxymethyl-1,3-propanediol, di-(2-hydroxyethyl)-5, 5-dimethylhydantoin, glycerol, diethylene glycol, triethylene glycol, tripropylene glycol, tetraethylene glycol, dipropyleneglycol, 3-methyl-1,3-butanediol, 3-methyl-1,5-pentanediol, 1-(2-hydroxyethyl)-2-imidazolidinone, 1,6-hexanediol, 1,5-pentanediol, and combinations thereof; and the non-hydroxylated co-solvent is selected from the group consisting of 2-pyrrolidinone, sulfolane, diethyleneglycol dimethyl ether, and combinations thereof.

3. The ink composition as defined in claim 2, excluding:

any other co-solvents; and acids chosen from stearic acid, elaidic acid, linolenic acid, saturated fatty acids having a carbon chain of fewer than 11 carbons, and saturated fatty acids having a carbon chain of more than 13 carbons.

4. The ink composition as defined in claim 1 wherein:

the isocyanate is selected from the group consisting of 1,6-hexamethylene diisocyanate (HDI), isophorone diisocyanate (IPDI), trimethylhexamethylene diisocyanate (TMDI), 2,4-toluene diisocyanate (2,4-TDI), 2,6-toluene diisocyanate (2,6-TDI), 4,4'-diphenylmethane diisocyanate (MDI), 4,4-dicyclohexylmethane diisocyanate ($H_{12}$MDI), 3,3'-dimethyl-4,4'-biphenyl diisocyanate (TODI), dodecane diisocyanate ($C_{12}$DI), 1,5-naphthalene diisocyanate (NDI), m-tetramethylene xylylene diisocyanate (TMXDI), 1,4-benzene diisocyanate, trans-cyclohexane-1,4-diisocyanate, and 4,6-xylyene diisocyanate;

the first diol is selected from the group consisting of dimethylol acetic acid, 2,2'-dimethylol butanoic acid, 2,2'-dimethylol propionic acid (DMPA), and 2,2'-dimethylol butyric acid; and the second diol is selected from the group consisting of 1,2-propanediol, 1,3-propanediol, ethylene glycol, 1,4-butanediol, 1,5-pentanediol, 1,6-hexanediol, 1,2-hexanediol, neopentyl glycol, 2-methyl-1,3-propanediol, 3-methyl-1,5-pentane diol, and combinations thereof.

5. The ink composition as defined in claim 4 wherein the at least three diols include one diol from the group of the first diol and two diols from the group of the second diol.

6. The ink composition as defined in claim 4 wherein the at least three diols further includes one diol from the group of the first diol, one diol from the group of the second diol, and a third diol i) having a formula OH—R—OH, wherein R is selected from the group consisting of a polyether, a polyester, a polycarbonate, a polycarbonate-co-polyester, and an acrylic, or ii) having a formula OH—$R^4$—OH, wherein $R^4$ is a $C_1$-$C_7$ alkyl, or a $C_6$-$C_{40}$ aryl, or a $C_9$-$C_{40}$ aryl substituted by $C_1$-$C_{10}$ alkyl.

7. The ink composition as defined in claim 4 wherein a number average molecular weight of the polyurethane copolymer binder ranges from about 3500 to about 10,000.

8. The ink composition as defined in claim 1 wherein:

the hydroxylated co-solvent is present in an amount ranging from about 9 wt % to about 14.5 wt % of the total wt % of the ink composition;

the non-hydroxylated co-solvent is present in an amount ranging from about 9 wt % to about 10.5 wt % of the total wt % of the ink composition; and the weight percentage of each of the hydroxylated co-solvent and the non-hydroxylated co-solvent is selected to satisfy the weight percent ratio.

9. The ink composition as defined in claim 1 wherein the hydroxylated co-solvent is 2-methyl-1,3-propanediol, and the non-hydroxylated co-solvent is 2-pyrrolidinone, and the weight percent ratio is about 50:50.

10. The ink composition as defined in claim 1 wherein the hydroxylated co-solvent is 2-hydroxyethyl-2-pyrrolidinone, and the non-hydroxylated co-solvent includes a combination of 2-pyrollidinone and sulfolane, and the weight percent ratio is about 56:44.

11. The ink composition as defined in claim 1 wherein:

the colorant is chosen from self-dispersed pigments, polymer dispersed pigments, dyes, and combinations thereof;

the colorant is present in an amount ranging from about 2 wt % to about 6.5 wt % of a total wt % of the ink composition;

a polyurethane copolymer binder is present in an amount ranging from about 1.0 wt % to about 3.0 wt % of the total wt % of the ink composition; and the acid is present in an amount ranging from about 0.03 wt % to about 1.0 wt %.

12. A print cartridge, comprising:

a fluid reservoir;

a fluid ejector in fluid communication with the fluid reservoir;

a nozzle in fluid communication with the fluid ejector;

an ink composition present in the fluid reservoir, the ink composition including:

a colorant present in an amount ranging from about 2.0 wt % to about 6.0 wt % of a total wt % of the ink composition;

a hydroxylated co-solvent;

a non-hydroxylated co-solvent, wherein a weight percent ratio of the hydroxylated co-solvent to the non-hydroxylated co-solvent in the ink composition ranges from 46:54 to about 62:38;

an acid selected from the group consisting of oleic acid, linoleic acid, undecanoic acid, dodecanoic acid, tridecanoic acid, and combinations thereof;

a polyurethane copolymer binder formed from the polymerization of a diisocyanate and at least three diols including a first diol containing a hydrophilic stabilizing group, and a second diol having less than 8 atoms in a backbone chain between two hydroxyl groups, wherein a mole percentage of the second diol is at least 30% of a total mole percentage of diol monomers in the polyurethane copolymer binder, and wherein an acid number of the polyurethane copolymer binder ranges from 50 to 75, the polyurethane copolymer binder present in an amount ranging from about 1.0 wt % to about 3.0 wt % of the total wt % of the ink composition;

lithium present in an amount ranging from about 50 ppm to about 400 ppm; and water; and an anti-evaporative layer present at an interface between air and the ink composition in an orifice of the nozzle, the anti-evaporative layer formed during uncapped non-use, thereby reducing evaporation of the water from the ink composition.

13. The print cartridge as defined in claim 12 wherein:

the hydroxylated co-solvent is selected from the group consisting of 2-methyl-1,3-propanediol, 2-hydroxyethyl-2-pyrrolidinone, 2-ethyl-2-hydroxymethyl-1,3-propanediol, di-(2-hydroxyethyl)-5, 5-dimethylhydantoin, glycerol, diethylene glycol, triethylene glycol, tripropylene glycol, tetraethylene glycol, dipropyleneglycol, 3-methyl-1,3-butanediol, 3-methyl-1,5-pentanediol, 1-(2-hydroxyethyl)-2-imidazolidinone, 1,6-hexanediol, 1,5-pentanediol, and combinations thereof; and the non-hydroxylated co-solvent is selected from the group consisting of 2-pyrrolidinone, sulfolane, diethyleneglycol dimethyl ether, and combinations thereof.

14. The print cartridge as defined in claim 12 wherein:

the isocyanate is selected from the group consisting of 1,6-hexamethylene diisocyanate (HDI), isophorone diisocyanate (IPDI), trimethylhexamethylene diisocyanate (TMDI), 2,4-toluene diisocyanate (2,4-TDI), 2,6-toluene diisocyanate (2,6-TDI), 4,4'-diphenylmethane diisocyanate (MDI), 4,4-dicyclohexylmethane diisocyanate ($H_{12}$MDI), 3,3'-dimethyl-4,4'-biphenyl diisocyanate (TODI), dodecane diisocyanate ($C_{12}$DI), 1,5-naphthalene diisocyanate (NDI), m-tetramethylene xylylene diisocyanate (TMXDI), 1,4-benzene diisocyanate, trans-cyclohexane-1,4-diisocyanate, and 4,6-xylyene diisocyanate;

the first diol is selected from the group consisting of dimethylol acetic acid, 2,2'-dimethylol butanoic acid, 2,2'-dimethylol propionic acid (DMPA), and 2,2'-dimethylol butyric acid;

the second diol is selected from the group consisting of 1,2-propanediol, 1,3-propanediol, ethylene glycol, 1,4-butanediol, 1,5-pentanediol, 1,6-hexanediol, 1,2-hexanediol, neopentyl glycol, 2-methyl-1,3-propanediol, 3-methyl-1,5-pentane diol, and combinations thereof; and the at least three diols further include a third diol having a formula OH—R—OH, where R is selected from the group consisting of a polyether, a polyester, a polycarbonate, a polycarbonate-co-polyester, and an acrylic.

15. A method for improving capped recovery performance of an ink composition having a high solids content, the method comprising:

selecting a polyurethane copolymer binder formed from the polymerization of a diisocyanate and at least three diols including a first diol containing a hydrophilic stabilizing group, and a second diol having less than 8 atoms in a backbone chain between two hydroxyl groups, wherein a mole percentage of the second diol is at least 30% of a total mole percentage of diol monomers in the polyurethane copolymer binder, and wherein an acid number of the polyurethane copolymer binder ranges from 50 to 75;

selecting a hydroxylated co-solvent;

selecting a non-hydroxylated co-solvent; and incorporating a weight percent ratio of the hydroxylated co-solvent to the non-hydroxylated co-solvent into a mixture, the weight percent ratio of the hydroxylated co-solvent to the non-hydroxylated co-solvent ranging from about 46:54 to about 62:38, and the mixture including:

from about 0.03 wt % to about 1.0 wt % of an acid selected from the group consisting of oleic acid, linoleic acid, undecanoic acid, dodecanoic acid, tridecanoic acid, and combinations thereof;

from about 2.0 wt % to about 6.5 wt % of a colorant;

from about 1.0 wt % to about 3.0 wt % of the polyurethane copolymer binder;

from about 4.5 wt % to about 9.0 wt % of a combination of the colorant and the polyurethane copolymer binder;

from about 50 ppm to about 400 ppm of lithium; and a balance of water.

* * * * *